United States Patent [19]
Kang et al.

[11] Patent Number: 5,870,112
[45] Date of Patent: Feb. 9, 1999

[54] DOT SCHEDULING FOR LIQUID INK PRINTERS

[75] Inventors: Henry R. Kang, Fairport; Joel W. Grover, Pittsford, both of N.Y.; Stephen F. Pond, Gainesville, Va.

[73] Assignee: Xerox Corporation, Stamford, Conn.

[21] Appl. No.: 670,025

[22] Filed: Jun. 25, 1996

[51] Int. Cl.$^6$ .............................. B41J 2/145; B41J 2/155
[52] U.S. Cl. .................................. 347/9; 347/12; 347/41; 347/42
[58] Field of Search .................. 347/41, 42, 9, 347/12

[56] References Cited

U.S. PATENT DOCUMENTS

| | | | |
|---|---|---|---|
| 4,748,453 | 5/1988 | Lin et al. | 346/1.1 |
| 4,965,593 | 10/1990 | Hickman | 346/140 |
| 4,967,203 | 10/1990 | Doan et al. | 346/1.1 |
| 4,999,646 | 3/1991 | Trask | 346/1.1 |
| 5,012,257 | 4/1991 | Lowe et al. | 346/1.1 |
| 5,422,666 | 6/1995 | Koyama | 347/41 |
| 5,485,183 | 1/1996 | Zandian et al. | 347/41 |
| 5,625,391 | 4/1997 | Hirabayashi et al. | 347/41 |
| 5,692,108 | 11/1997 | Donahue | 395/108 |

FOREIGN PATENT DOCUMENTS 60-107975 6/1985 Japan .

*Primary Examiner*—Russell Adams
*Assistant Examiner*—Christopher E. Mahoney
*Attorney, Agent, or Firm*—Daniel J. Krieger; William F. Eipert

[57] ABSTRACT

A method and apparatus of printing with a liquid ink printhead ejecting ink in swaths on a recording medium to form an image including a plurality of dots deposited at pixel locations of a scanline. The printer deposits a plurality of dots at adjacent pixel locations on the scan line during non-consecutive swaths of the printhead to form the image. Dot interaction between dots is minimized so that no two dots are deposited adjacent to each other in consecutive depositions of the dots of consecutive swaths of the printhead. Reduction of ink bleeding, printhead signatures such as banding, and other defects caused by clogged nozzles of the printhead are reduced.

13 Claims, 7 Drawing Sheets

DOT SCHEDULING FOR LIQUID INK PRINTERS

FIELD OF THE INVENTION

The present invention relates generally to liquid ink recording apparatus and more particularly relates to printing techniques for drop-on-demand type liquid ink printers.

BACKGROUND OF THE INVENTION

Liquid ink printers of the type frequently referred to as continuous stream or as drop-on-demand, such as piezoelectric, acoustic, phase change wax-based or thermal, have at least one printhead from having drop ejectors which droplets of ink are directed towards a recording sheet. Within the printhead, the ink is contained in a plurality of channels. Power pulses cause the droplets of ink to be expelled as required from orifices or nozzles at the end of the channels.

In a thermal ink-jet printer, the power pulses are usually produced by resistors, each located in a respective one of the channels, which are individually addressable to heat and vaporize ink in the channels. As voltage is applied across a selected resistor, a vapor bubble grows in the associated channel and initially the ink bulges from the channel orifice. The bubble quickly collapses and the ink within the channel then retracts and separates from the bulging ink thereby forming a droplet moving in a direction away from the channel orifice and towards the recording medium whereupon hitting the recording medium a dot or spot of ink is deposited. The channel is then refilled by capillary action, which, in turn, draws ink from a supply container of liquid ink. Operation of a thermal ink-jet printer is described in, for example, U.S. Pat. No. 4,849,774.

The ink jet printhead may be incorporated into either a carriage type printer, a partial width array type printer, or a page-width type printer. The carriage type printer typically has a relatively small printhead containing the ink channels and nozzles. The printhead can be sealingly attached to a disposable ink supply cartridge and the combined printhead and cartridge assembly is attached to a carriage which is reciprocated to print one swath of information (equal to the length of a column of nozzles), at a time, on a stationary recording medium, such as paper or a transparency. After the swath is printed, the paper can be stepped a distance equal to the height of the printed swath or a portion thereof, so that the next printed swath is contiguous or overlapping therewith. This procedure is repeated until the entire page is printed. In contrast, the page width printer includes a stationary printhead having a length sufficient to print across the width or length of a sheet of recording medium at a time. The recording medium is continually moved past the page width printhead in a direction substantially normal to the printhead length and at a constant or varying speed during the printing process. A page width ink-jet printer is described, for instance, in U.S. Pat. No. 5,192,959.

Printers print information received from an image output device such as a personal computer. Oftentimes, this received information is in the form of a raster scan image such as a full page bitmap or in the form of an image written in a page description language. The raster scan image includes a series of the scan lines or rows consisting of bits representing pixel information in which each scan line or row contains information sufficient to print a single fine line of information across a page in a linear fashion. Printers can print bitmap information as received. If a printer receives an image written in the page description language, however, the printer or the image input device converts the page description language to a bitmap consisting of pixel information.

The density of information contained in the full page bitmap can correspond to the density of the image to be printed by the liquid ink printer. For instance, in a thermal ink jet printhead printing at 300 spots per inch, the full page bitmap will have information enabling the printhead to print at the required density. Known printers also manipulate image bitmaps to print at resolutions greater than or less than the resolution of the received image.

In reciprocating carriage printers, image defects can occur due to non-uniform absorption and drying of the ink. These image defects can be reduced by printing the image in more than one pass of the printhead, wherein each pass prints a portion of the pixels in a dot pattern known as a "checkerboard" pattern. In this type of two pass printing, a first pass of the printhead carriage prints a swath of information in which odd numbered pixels of odd numbered rows or scanlines and even numbered pixels of even numbered rows or scanlines of a bitmap are printed. In a second pass of the carriage printhead, the complementary pattern consisting of even numbered pixels in odd numbered rows and odd numbered pixels in even numbered rows is printed. By printing in two passes, the ink printed in the first pass has time to dry partially before the ink from the second pattern is deposited.

Printing in passes of the printhead can, however, produce a print defect known as "banding". Banding is the phenomenon which results from printing one swath of information next to another swath of information such that no overlap of adjacent swaths occurs and a line or band is apparent between adjacent swaths. Banding may also occur if the printhead ejects drops of varying sizes and in different firing directions due to directionality problems. To reduce or prevent banding, checkerboard patterns are typically printed in overlapping swaths. While conventional checkerboarding can reduce image defects and overlapping of checkerboard swaths can reduce or eliminate banding image defects, further improvements are desirable since complete or partial overlapping of checkerboard patterns may not reduce image defects to a desirable level. The following references describe these and other problems associated with liquid ink printing and provide a variety of solutions for these known problems.

U.S. Pat. No. 4,748,453 to Lin et al., describes a method of depositing spots of liquid ink upon selected pixel centers on a substrate having poor ink absorptive properties. The lines of information are printed in at least two passes so that liquid ink is deposited on selected pixel centers in a checkerboard pattern. In a second pass, the complementary checkerboard pattern is deposited over the first checkerboard pattern.

U.S. Pat. No. 4,999,646 to Trask describes a multiple pass complementary dot pattern ink jet printing process. Successive printed swaths of information are made by depositing a first dot pattern and a second partially overlapping complementary dot pattern on the print media. The adjacent spacing of dots is alternated in coincident dot rows and the first and second dot patterns are overlapped by a predetermined percentage which is less than 100%.

Japanese Laid-Open No. 60-107975, entitled "Ink Jet Recording Apparatus" describes an ink jet recording apparatus having a recording head scanning in a lateral direction wherein a first main scan and a second main scan overlap. The array of print dots in the overlapping area are printed only once. The dots within the array of dots are printed by either the first main scan or the second main scan wherein odd rows of the overlapping area are printed by the first scan and even rows are printed by the second scan, every other column of the odds rows and the other columns of the even rows are printed by the first scan and remaining dots are printed by the second scan, or the overlapping area is elected at random to be printed by the first main scan or the second main scan.

U.S. Pat. No. 4,967,203 to Doan et al. describes an interlace printing process for an ink jet printer. Printed images are produced by staggering applications of ink dots to pixel locations such that overlapping ink dots are printed on successive passes of a printhead and such that swaths are partially printed on overlapping passes of the printhead. Multi-colored or multi-shaded images are completed by grouping pixels into superpixels and applying various combinations of colored ink dots to the various pixels within each superpixel in a staggered sequence.

U.S. Pat. No. 5,012,257 to Lowe et al. describes ink jet color graphics printing where an image superpixel consists of a 2×2 array of cells wherein each cell corresponds to a pixel area on a substrate. Each pixel of graphics data is processed to form a 2×2 array of bit image data for printing a corresponding superpixel image. A superpixel configuration indicating cell location and color of drops of ink for forming a superpixel image is defined for each desired image color.

SUMMARY OF THE INVENTION

In accordance with one aspect of the present invention, there is provided a method of printing with a liquid ink printhead including drop ejectors ejecting ink in swaths including a plurality of scanlines on a recording medium to form a complete image including a plurality of dots deposited at pixel locations of one of the scanlines. The method includes the step of depositing a plurality of dots at adjacent pixel locations on the scan line during non-consecutive swaths of the printhead to form the complete image.

Pursuant to another aspect of the present invention, there is provide a method of printing with a liquid ink printhead ejecting ink in a number, n, of multiple swaths on a recording medium to form an image including dots arranged in a plurality of scanlines including pixel locations. The method includes depositing a plurality of dots at adjacent pixel locations on the plurality of scanlines during non-consecutive swaths of the printhead to form the complete image.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
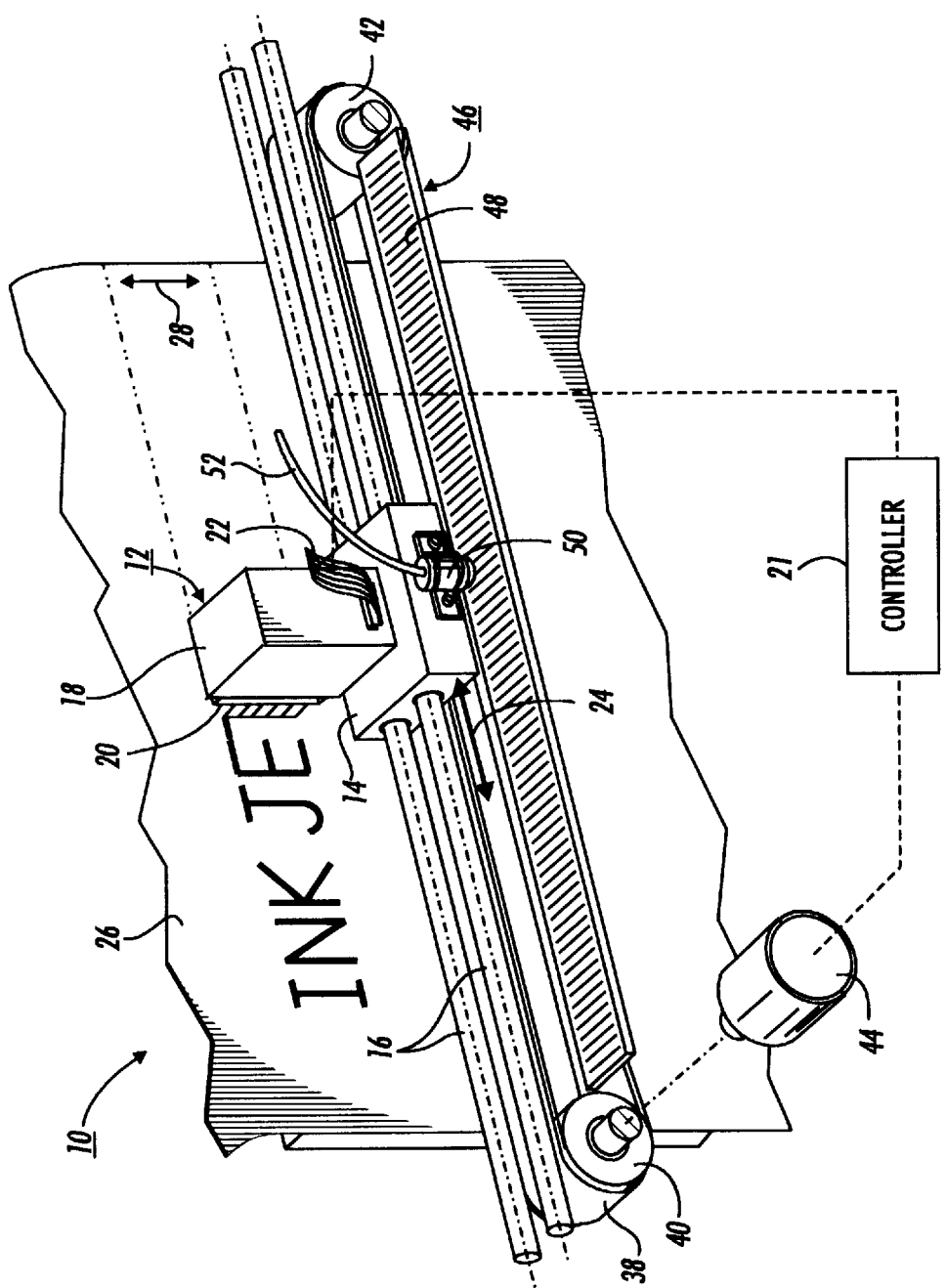
FIG. 1 is a partial schematic perspective view of an ink jet printer incorporating the present invention.

FIG. 1 illustrates a partial schematic perspective view of an ink jet printer 10 having an ink jet printhead cartridge 12 mounted on a carriage 14 supported by carriage rails 16. The printhead cartridge 12 includes a housing 18 containing ink for supply to a thermal ink jet printhead 20 which selectively expels droplets of ink under control of electrical signals received from a controller 21 of the printer 10 through an electrical cable 22. The printhead 20 contains a plurality of ink conduits or channels (not shown) which carry ink from the housing 18 to respective ink ejectors, which eject ink through orifices or nozzles (also not shown). When printing, the carriage 14 reciprocates or scans back and forth along the carriage rails 16 in the directions of the arrow 24. As the printhead cartridge 12 reciprocates back and forth across a recording medium 26, such as a sheet of paper or transparency, droplets of ink are expelled from selected ones of the printhead nozzles towards the sheet of paper 26. The ink ejecting orifices or nozzles are typically arranged in a linear array substantially perpendicular to the scanning direction 24. During each pass of the carriage 14, the recording medium 26 is held in a stationary position. At the end of each pass, however, the recording medium is stepped by a stepping mechanism under control of the printer controller 21 in the direction of an arrow 28. For a more detailed explanation of the printhead and printing thereby, refer to U.S. Pat. No. 4,571,599 and U.S. Pat. No. Reissue 32,572, the relevant portions of which are incorporated herein by reference.

It is well known and commonplace to program and execute imaging, printing, document, and/or paper handling control functions and logic with software instructions for conventional or general purpose microprocessors, such as the controller 21. This is taught by various prior patents and commercial products. Such programming or software may of course vary depending on the particular functions, software type, and microprocessor or other computer system utilized, but will be available to, or readily programmable without undue experimentation from, functional descriptions, such as those provided herein, or prior knowledge of functions which are conventional, together with general knowledge in the software and computer arts. That can include object oriented software development environments, such as C++. Alternatively, the disclosed system or method may be implemented partially or fully in hardware, using standard logic circuits or a single chip using VLSI designs.

The carriage 14 is moved back and forth in the scanning directions 24 by a belt 38 attached thereto. The belt 38 is driven by a first rotatable pulley 40 and a second rotatable pulley 42. The first rotatable pulley 40 is, in turn, driven by a reversible motor 44 under control of the controller 21 of the ink jet printer. In addition to the toothed belt/pulley system for causing the carriage to move, it is also possible to control the motion of the carriage by using a cable/capstan, lead screw or other mechanisms as known by those skilled in the art.

To control the movement and/or position of the carriage 14 along the carriage rails 16, the printer includes a linear encoder having an encoder strip 46 which includes a series of fiducial marks in a pattern 48. The pattern 48 is sensed by a sensor 50, such as a photodiode/light source attached to the printhead carriage 14. The sensor 50 includes a cable 52 which transmits electrical signals representing the sensed fiducial marks of the pattern 48 to the printer controller. Other encoders, including rotary encoders, are also possible.

When printing with a liquid ink printer, a host computer, or other image generating device, provides printing information in the form of a bitmapped image or page description language containing pixel information to the printer for printing. The controller 21 is typically connected to a read only memory (ROM) which includes an operating program for the controller 21 as well as the printer 10. A random access memory (RAM), also connected to the controller 21 includes accessible memory including print buffers for the manipulation and storage of data, including printing information in the form of bitmaps received from the image generating device.

Figure 2:
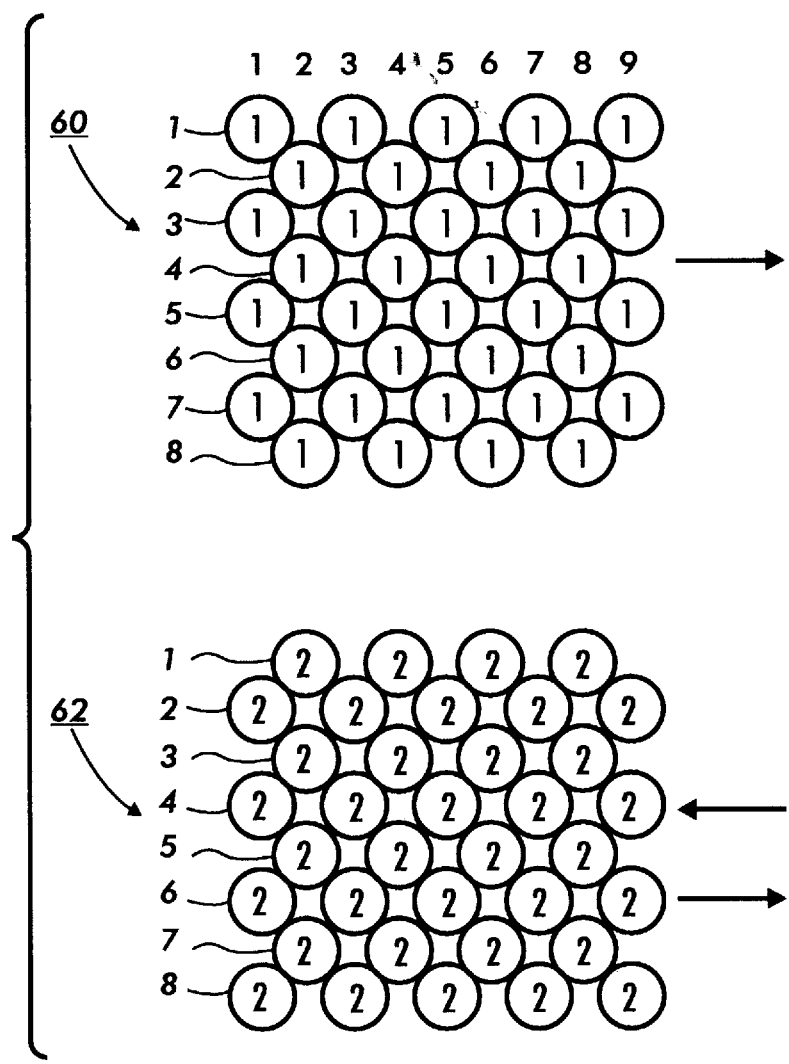
FIG. 2 illustrates the locations of ink drops deposited by a printhead in a checkerboard pattern.

The controller 21 is coupled to one or more printhead control circuits through a bus. The printhead control circuits receive information over the bus for controlling printhead elements. The printhead elements are controlled by the controller 21 according to the content of signals received to control selected ejection of inks from the nozzles of the printhead element. It has been shown that printing with liquid ink printers is improved when a single swath of information is printed in more than one pass of the printhead carriage across a page. When printing in two passes, a pattern known as a "checkerboard" pattern is deposited in a first pass 60 of the printhead carriage, as illustrated in FIG. 2. The first pass 60 includes a number one in each of the circles (illustrating ink drops) to indicate that these drops were deposited in the first pass. In a second pass 62, the complementary checkerboard pattern of ink drops are deposited, each drop including a number two to show that these drops have been deposited in a second pass. This convention of numbering drops to indicate pass numbers will be continued throughout. The second pass is deposited over the first pass such that all pixel locations include deposited ink drops. This type of printing is described in U.S. Pat. No. 4,748,453 to Lin et al., entitled "Spot Deposition for Liquid Ink Printing" assigned to Xerox Corp., and incorporated herein by reference. It is also known that overlapping of printing swaths, will reduce a printing defect known as "banding" which is described in U.S. Pat. No. 4,622,561 to Koike and U.S. Pat. No. 4,999,646 to Trask.

While checkerboard patterns have been shown to improve the quality of printing formed by dot matrix printers or liquid ink printers, such methods of printing can still produce printing defects since the checkerboard pattern consists of a repetitive pattern of dots placed in predetermined locations. Consequently, should one or more of the ink jet nozzles in a printhead be either non-functioning or defective such that ink is expelled along an incorrect trajectory or the spot size is non-uniform, two-pass checkerboard printing can still produce noticeable image defects.

Liquid ink printers including ink jet printers deposit black and/or colored liquid inks which tend to spread when the ink is deposited on paper as a drop, spot, or dot. Severe bleeding occurs when the dots are placed next to each other in a consecutive order or in a cluster of dots within a short time. Bleeding, spreading, and feathering causes print quality degradation such as color shift, reduction in edge sharpness and solid area mottle which includes density variations in said areas due to puddling of inks. While checkerboard printing as previously described can solve some of these problems to a certain extent, such problems are not totally eliminated especially when printing black as well as color images at higher resolutions. In addition, printing on transparencies and glossy paper requires stringent control of image quality. Consequently, the present invention includes a printing method and apparatus for depositing ink drops on paper to minimize bleeding and solid area mottling problems by scheduling the printing of dots in a fashion that minimizes interaction between consecutively printed drops. The minimized interaction is achieved by multiple printing passes of a scan line and row as well as scheduling the deposition of ink drops in a specific order during printing of the multiple passes. The present invention also provides more time for drying such that ink bleeding, spreading, mottling and feathering is substantially reduced. In addition, in multiple pass printing where the paper is advanced less than a swath height, a different nozzle will deposit ink drops during some of the n-passes. Since the directionality of different nozzles is not always perfectly uniform, the face and corner overlaps will be mitigated by misdirection.

While there are n! (factorial) ways of sequentially depositing ink drops in a single scan line for n printing passes, where n is an integer greater than 1, not all sequences provide acceptable printing results. Since the drop sequence is repeated until the end of the scan line, any circular rotations of the sequence result in the same drop sequence and therefore there are, in actuality, n!/n or (n−1)! unique sequences for any n pass printing sequence. For instance, in a three pass printing scheme there are six dot sequences.

1, 2, 3
2, 3, 1
3, 1, 2
1, 3, 2
2, 1, 3
3, 2, 1

The numbers 1, 2, and 3 indicate the pass number of the scanning printhead. Among these dot sequences, 123, 231 and 312 are equivalent due to circular rotation and the same is true for the sequences 132, 213, and 321.

The present invention is directed to minimizing the drop interaction between drops in multiple pass printing such that no two drops are deposited next to each other along a scan line in consecutive passes unless there is no other way of arranging the drops. Using this criterion, it has been determined that preferred drop sequences have a minimum number of face and corner overlaps, where face overlaps occur between adjacent dots along a single scan line and where corner overlaps occur between diagonally adjacent dots of two adjacent scan lines. This criterion is met when the number of passes, n, is greater than 4.

To illustrate the concept of face overlaps, a two pass dot schedule sequence such as that found in checkerboard printing illustrates that there is only one way of arranging two numbers in consecutive order as follows:

First pass: 1__1__1__1__
Second pass: 12121212 where "__" of the first pass indicates an open or unprinted pixel location As can be seen, each individual dot deposited in the second pass has two face overlaps with dots deposited in the first pass.

For three pass dot scheduling, there are two sequences 123 or 132. In a first pass, each deposited drop is separated by two open pixel locations. Consequently, the second space and third spaces can only be filled in one of the two remaining passes. Depositing a drop in either space will, however, cause a face overlap with the drop which was deposited in the first pass. From a consideration of dot overlaps, there is no difference between the sequences 123 and 132. The third pass would fill the remaining open spaces in the scan line.

For a four pass dot scheduling scheme, there are (4-1)! sequences as follows:

1234, 1243, 1324, 1342, 1423, and 1432.

As can be seen, none of the sequences meets the previously described criterion for minimizing drop interaction. Even though none of these sequences meets the previously described criterion, it might appear that the dot sequences 1324 and 1423 have an advantage of no dot overlapping for the second pass. This advantage, however, is short lived, since during the third pass there would be two face overlaps. The other four sequences have one face overlap each for the second and third passes. It is, however, possible to determine the effect of timing between passes and therefore dot overlap. For instance, if the bleeding of ink caused by the overlap of the first and third (or fourth) pass is significantly less than the overlap of the second and third passes, there may be an advantage by using sequences 1324 and 1423.

Optimum drop sequences for five or more passes can be determined. For instance, with five passes there is a total of 24 sequences. Of these 24 sequences, only two sequences 13524 and 14253 meet the criterion for the optimum dot placement. Likewise, for six passes there are 120 ways of arranging six dots in which only 10 sequences meet the criterion of the optimum dot separation. They are:

135246, 135264, 136425, 142536, 142635, 146253, 152463, 153624, 163524, and 164253.

For eight passes there are 5,040 sequences of which many meet the criterion for the optimum dot separation such as 13526847, 13527468, 13527486, 13528647, 13572468, etc.

Figure 3:
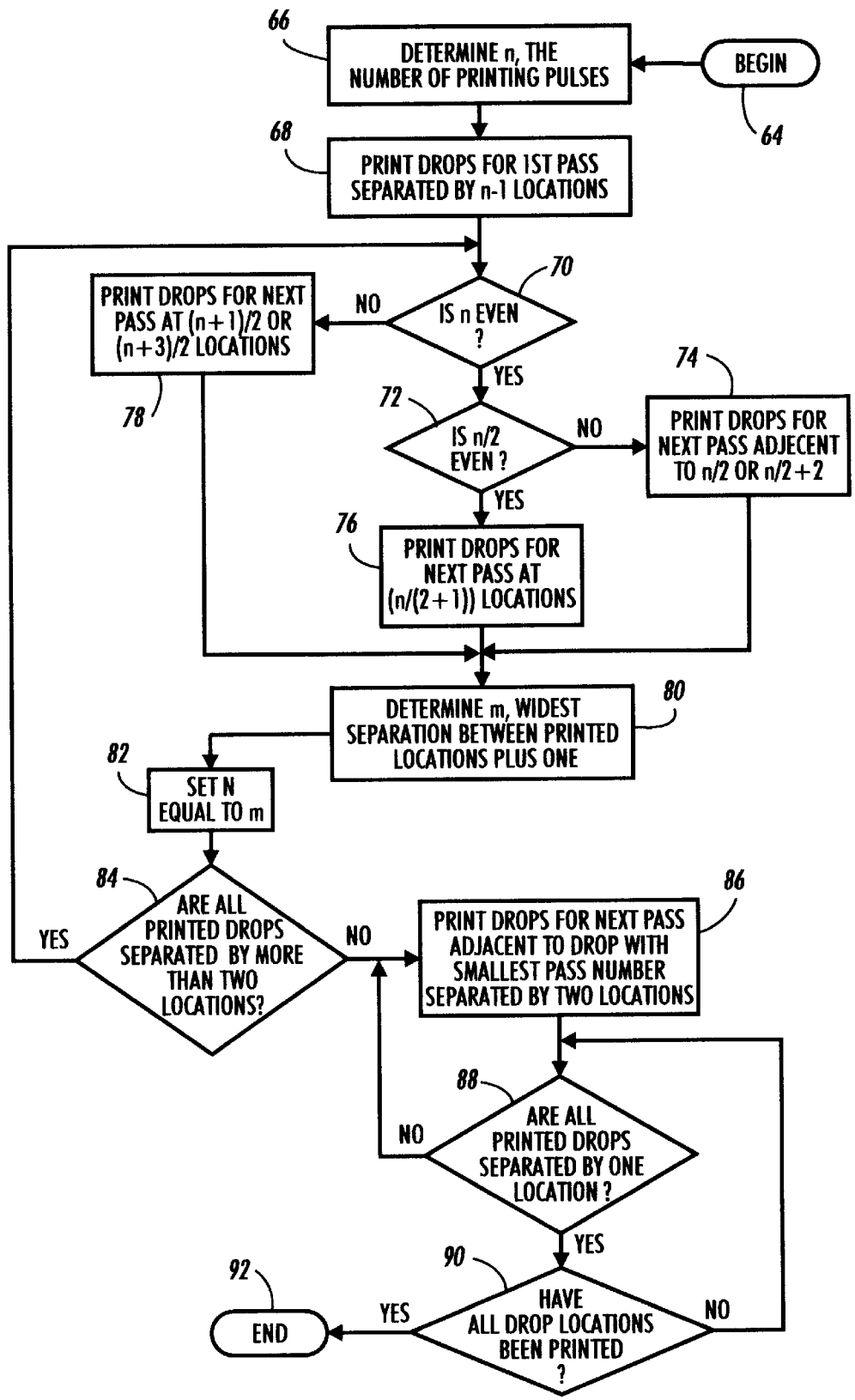
FIG. 3 illustrates a flow chart indicating the determination of a printing schedule of dots in a multi-pass printing scheme of the present invention.

Since the number of dot placement sequences that meet the criterion increases rapidly as the number of passes increases, the present invention includes a drop placement scheme which provides a guide to the optimum drop scheduling for printing images in multiple passes with minimum drop interaction as illustrated in FIG. 3. While the present invention will be described with regards to determining which drops to print and in what sequence during a printing operation, the present invention also includes analyzing bitmaps before being printed, determining the drop sequence for the entire bitmap before any printing occurs and then sending the necessary information to the printer and the printhead therefore to affect printing in the multiple pass printing scheme of the present invention.

Once the necessary image information has been generated to begin at step 64, it is determined what the number of printing passes, n, will be for the selected printing scheme. The number of printing passes selected is dependent on the type of information being printed, as well as the inks and recording medium being used and the resolution of the resultant printed image. Once the number of printing passes has been determined at step 66, the drops at the first pass are printed at step 68 and are separated by n−1 pixel locations or spaces where pixel locations along a scanline are indicated in multiples of the number of swaths so that a pixel location ranges from 1 to n which is repeated many times along the scanline. This step 68 provides the maximum separation between drops along a single scan line. Once the drops for the first pass have been deposited, it is then necessary to determine which drops will be printed next based on whether or not n is determined to be even at step 70. If n is determined to be even, then at step 72 it is determined whether or not n/2 is even. If n/2 is not even, then at step 74 dots are printed for the next pass such that the dots are printed next to or adjacent to the n/2 or n/2+2 pixel locations. If, however, n/2 is even, then in step 76 the dots printed are printed at the n/2+1 locations. These two printing situations provide for optimum drop separation where the number of printing passes is even. If, however, at step 70, it is determined that n is odd, then at step 78, drops are deposited for the next pass at the (n+1)/2 or (n+3)/2 locations.

After printing drops in this particular pass, a value for m at step 80 is determined, where m is equal to the widest separation between printed locations plus 1. Drops which can be deposited within this range of widest separations will be printed in the next pass by setting n equal to m at step 82. After n has been set equal to m, it is determined at step 84 whether or not all printed drops are separated by two locations or more spaces. If, yes, then steps 72, 74, 76 and 78 are repeated, if necessary, depending on whether or not the value of n is even or odd. Step 84 is repeated to determine when all the printed drops are not separated by more than two locations. At step 86, the drops in the next pass are deposited adjacently to a drop separated from another drop by two open spaces and which has the smallest pass number. As can be seen, by proper dot scheduling, no drops are deposited next to a drop deposited in an immediately proceeding printing pass. So, for instance, if it is determined at step 86 that the next drop for the current pass can either be printed next to a drop which was deposited in pass 1 or next to the drop deposited in pass 4 then the drop is deposited next to the drop of pass 1 thereby reducing the possibility of print defects. At step 88, it is determined whether or not all the drops are separated by a single location. If not, additional drops are deposited adjacently to those with the smallest pass number separated by two locations as described for step 86. Once all the remaining drops are separated by a single location as determined at step 88, printing is continued until all the drop locations have been printed at step 90. After it has been determined that all the drop locations have been printed, then the printing is concluded at step 92.

To illustrate this method of printing, a seven pass example is shown as follows:

| PASS 1 | 1 – – – – – – |    |                 |
|--------|---------------|----|-----------------|
| PASS 2 | 1 – – 2 – – 1 | or | 1 – – – 2 – – 1 |
| PASS 3 | 1 – – 2 – 3 – 1 | or | 1 – 3 – 2 – – 1 |
| PASS 4 | 1 4 – 2 – 3 – 1 | or | 1 – 3 – 2 – 4 1 |
| PASS 5 | 1 4 – 2 – 3 5 1 | or | 1 5 3 – 2 – 4 1 |
| PASS 6 | 1 4 – 2 6 3 5 1 | or | 1 5 3 6 2 – 4 1 |
| PASS 7 | 1 4 7 2 6 3 5 1 | or | 1 5 3 6 2 7 4 1 |

After the scanline drop interaction is minimized similar reasoning is applied to a two dimensional image or plane wherein the criterion is to minimize the face and corner overlaps between adjacent scanlines. For instance, in a two pass algorithm adjacent scanlines can be either printed in phase or such that drops in adjacent lines of a single pass staggered by one pixel location such that the drops are diagonally placed. When in phase, there are two face overlaps for each individual drop between scan lines. When adjacent lines are offset by one pixel from line to line drop, each individual drop has four corner overlaps. The degree of drop interaction, however, is less for four corner overlaps. This is known as the checkerboard printing scheme where the second pass fills all of the empty spaces. For three passes, there are two linear sequences, 123 and 132. When printing adjacent scanlines in the first pass, each dot is shifted in an adjacent scanline from a dot in a previous scanline by one pixel position. This scheme gives two corner overlaps for each individual dot in the first pass. From an overlapping consideration, there is no difference between whether each consecutive drop is shifted by one pixel or two pixel locations. If the sequence 123 is used, then in the second pass there will be two face overlaps and two corner overlaps for each dot in the second pass. The same degree of overlapping is obtained for the sequence 132. A third pass would complete filling of all of the pixel locations.

Figure 4:
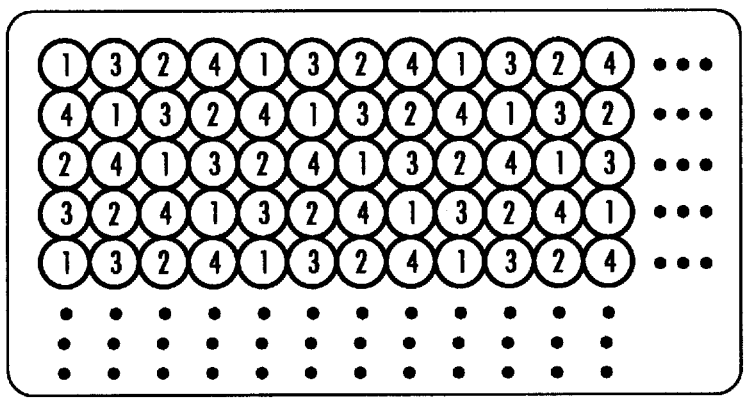
FIG. 4 illustrates a first dot sequence for a four pass printing scheme.
Figure 5:
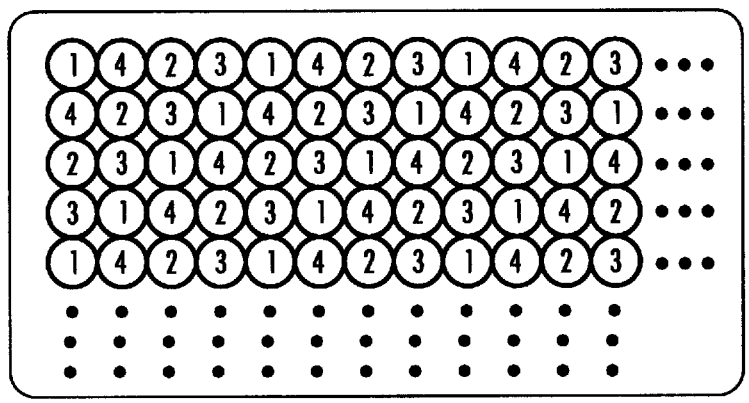
FIG. 5 illustrates a second dot sequence for a four pass printing scheme.
Figure 6:
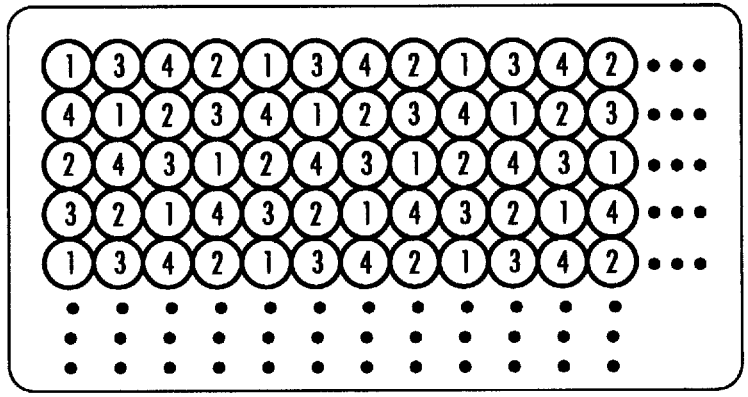
FIG. 6 illustrates a third dot sequence for a four pass printing scheme.
Figure 7:
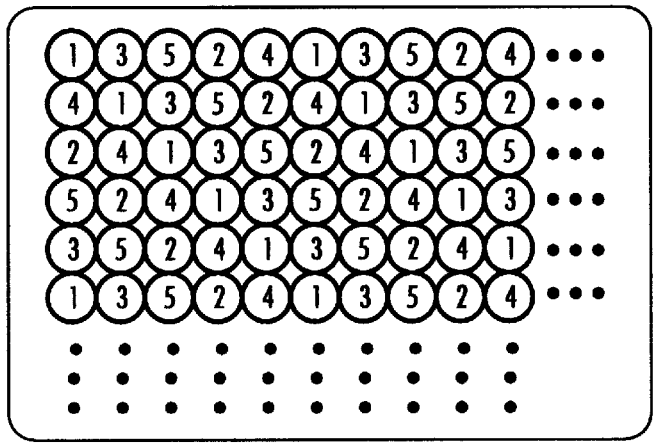
FIG. 7 illustrates a first dot sequence for a five pass printing scheme.
Figure 8:
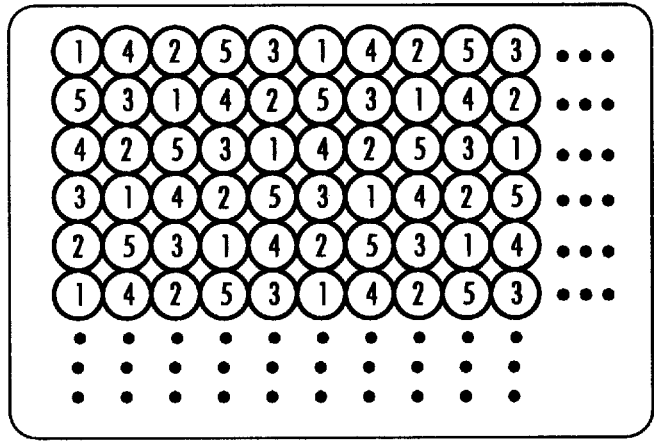
FIG. 8 illustrates a second dot sequence for a five pass printing scheme.

Several examples of four pass drop scheduling are illustrated in FIGS. 4, 5 and 6. As illustrated in FIG. 4, the drop sequence of 1324 is used throughout. In FIG. 5, the dot sequence 1423 is used throughout. While it is possible to mix dot sequences as illustrated in FIG. 6, it is not recommended since while wide drop separations may be obtained in early printing passes, penalties are paid with later printing passes and drop interaction increases. Examples of five pass dot scheduling is illustrated in FIG. 7 as well as in FIG. 8. Both of these examples meets the previously described criterion which is to minimize the face overlaps and the corner overlaps between scanlines. While face overlaps and corner overlaps still occur between scanlines, the examples of FIGS. 7 and 8 include dot scheduling in a two dimensional plane whereby dot interaction is minimized.

Figure 9:
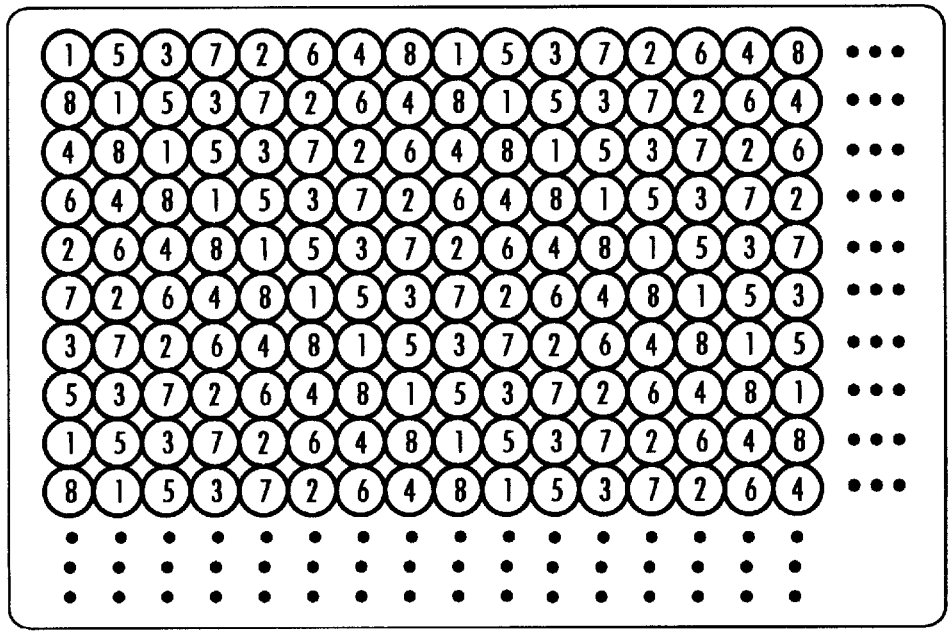
FIG. 9 illustrates a dot sequence for an eight pass printing scheme.

As a further example of dot scheduling in a two dimensional plane, FIG. 9 illustrates one example of an eight pass dot scheduling. Many other patterns meet the requirements of minimum drop interaction for eight passes since there are many more drop sequences available.

It can be seen, in light of the above examples, that any one dimensional pattern selected having minimum dot interaction along a scanline can be used with proper pixel location shifting for the subsequent passes to minimize drop overlapping in a two dimensional plane. Liquid ink printing depositing discrete droplets of ink include three frequently encountered problems that cause print quality degradation. A first problem is known as banding (or head signature) due to the systematic drop placement errors. A second problem results from missing drops due to nozzle clogging. The third problem is paper advance accuracy. In a 300 dots per inch (dpi) inkjet printer, for instance, a single missing nozzle can be clearly seen on hard copy prints. To reduce the effect of these problems, a method known as interleaving has been used with checkerboard printing. The present invention, however, improves upon this simple scheme by using a process of interleaving along with drop scheduling where interleaving includes determining paper step size based on the number of nozzles of an ink jet printhead and the number of passes necessary to complete full coverage of a scan line.

For the present invention using drop scheduling in a two dimensional plane with interleaving, it has been found that the paper step size can be set equal to an integer equal to the (number of nozzles/number of passes)+0.5, wherein the result is rounded up to the next nearest integer. Consequently, for a printhead having 24 jets and three passes, the paper step size would be equivalent to eight scanlines. If, however, the number of jets is not the integer multiple of the number of passes, then the paper step size is not uniform from pass to pass. For instance, printing with 24 jets in five passes will have a step size of 5 for the first four passes and a step size of four passes for the last pass. In addition, it has been found that good print quality is obtained by offsetting the drops deposited in adjacent scanlines of the same pass by a single pixel location in the scanning direction.

Figure 10:
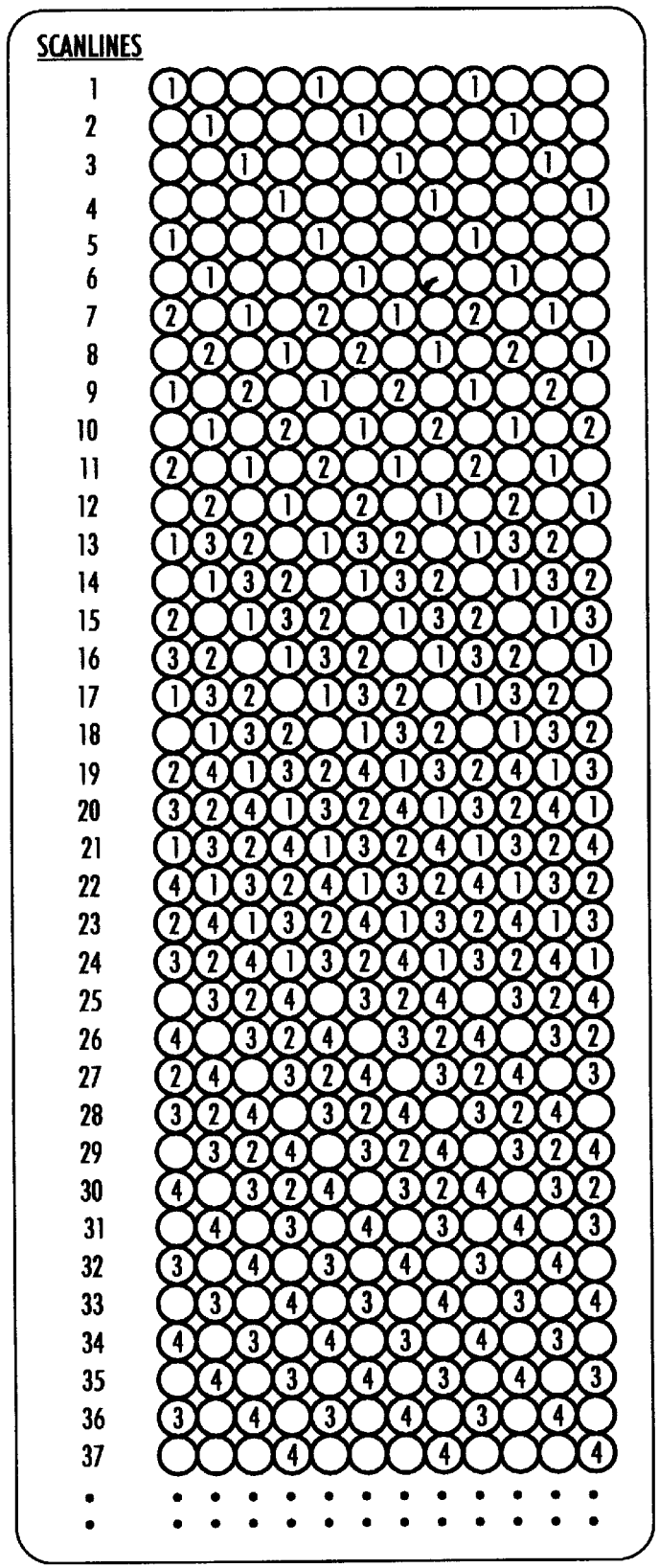
FIG. 10 illustrates a dot sequence in a two dimensional plane with interleaving for a four pass printing scheme.

As illustrated in FIG. 10 for a 24 nozzle printhead printing in four passes, the placement of drops for passes 1–4 is illustrated, wherein the drops deposited in the first pass are marked with a 1, the drops deposited in the second pass are marked with a 2, the drops deposited in the third pass and fourth pass are marked with a 3 and 4, respectively. Printing with four passes and a printhead of 24 nozzles provides a paper step size equivalent to six scanlines. Consequently, at scanline 7 pass 2 begins at scanline 13 pass 3 begins and at scanline 19 pass four begins. At scanline 19 complete coverage of the paper starts. Of course, in a practical implementation of the drop scheduling of FIG. 10, the first 18 scanlines would not be printed and only the bottom or lowest six nozzles of the twenty-four nozzle printhead would eject ink a first pass. Once the first pass has been printed, the paper is stepped six nozzles in the paper advance direction and the lowest 12 nozzles of the printhead are used to print the second pass of scanlines 19–30. The third pass would then use the bottom 18 nozzles and the fourth pass would use all 24 nozzles if full page coverage is desired. In printing the bottom portion of the page, the process is reversed such that the bottom or lowest nozzles of the printhead don't print ink once that portion of the printhead has moved past the recording medium.

Figure 11:
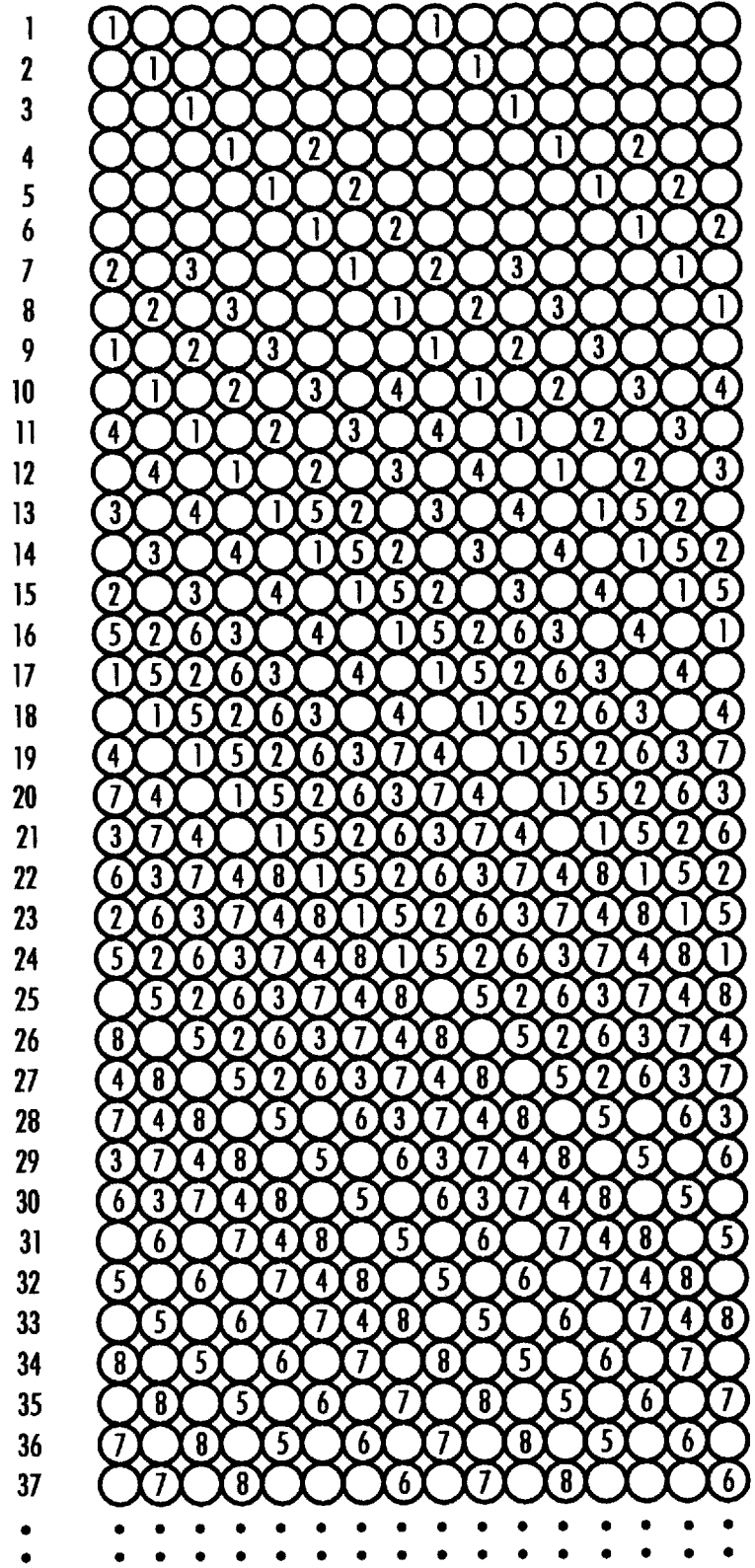
FIG. 11 illustrates a dot sequence in a two dimensional plane with interleaving for an eight pass printing scheme.

FIG. 11 illustrates drop scheduling in a two dimensional plane with interleaving for an eight pass printing scheme. Eight passes with a 24 nozzle printhead provide a paper step advance of three nozzles in height. Consequently, full coverage of the image could not be generated until scanline 22.

It is, therefore, apparent that there has been provided in accordance with the present invention, a method and apparatus that fully satisfies the aims and advantages hereinbefore set forth. For instance, the present invention includes printers and printing methods where printing is performed in multiple passes which are interleaved. Such printing provides scan lines being printed with time dispersion among pixels along the scanline, improved absorption and drying, and drop ejector dispersion. Drop ejector dispersion, drop size differences, directionality differences and velocity or arrival time variations are averaged within a scanline. In addition, the overlay of colored inks as well as the blending of drops is also improved. While this invention has been described in conjunction with a specific embodiment thereof, it is evident that many alternatives, modifications, and variations will be apparent to those skilled in the art. The present invention is not limited to thermal ink jet printheads but applies to all liquid ink printheads including continuous stream as well as phase change wax based. Accordingly, it is intended to embrace all such alternatives, modifications and variations that fall within the spirit and broad scope of the appended claims.

What is claimed is:

1. A method of printing with a liquid ink printhead including drop ejectors ejecting ink in swaths including a plurality of scanlines on a recording medium to form an image including a plurality of dots deposited at pixel locations of a scanline of the plurality of scanlines, comprising:

selecting a number, n, of the multiple swaths of the printhead to be greater than four;

depositing a first plurality of dots at pixel locations separated by n minus one pixel locations; and depositing a second plurality of dots on the scanline at multiples of pixel locations (n+1)/2 if n is an odd number or pixel locations (n+3)/2 if n is an odd number.

2. The method of claim 1, wherein second depositing step includes depositing the second plurality of drops on the scanline by advancing the recording medium a distance equivalent to a portion of the swath.

3. A method of printing with a liquid ink printhead including drop ejectors ejecting ink in swaths including a plurality of scanlines on a recording medium to form an image including a plurality of dots deposited at pixel locations of a scanline of the plurality of scanlines, comprising:

selecting a number, n, of the multiple swaths of the printhead to be greater than four;

depositing a first plurality of dots at pixel locations separated by n minus one pixel locations; and depositing a second plurality of dots on the scanline at multiples of pixel locations n/2 if n is even and if n/2 is an odd number or pixel locations (n/2)+2 if n is even and if n/2 is an odd number.

4. A method of printing with a liquid ink printhead including drop ejectors ejecting ink in swaths including a plurality of scanlines on a recording medium to form an image including a plurality of dots deposited at pixel locations of a scanline of the plurality of scanlines, comprising:

selecting a number, n, of the multiple swaths of the printhead to be greater than four;

depositing a first plurality of dots at pixel locations separated by n minus one pixel locations; and depositing a second plurality of dots on the scanline at pixel locations n/2+1 if n is an even number and if n/2 is an even number.

5. The method of claims 1, 3, or 4, wherein said second depositing step comprises determining the greatest number, m, of consecutive open pixel locations of the scanline.

6. The method of claim 5, wherein said depositing step comprises depositing a third plurality of dots adjacent to a previously deposited dot separated from another previously deposited dot by open pixel locations.

7. The method of claim 6, wherein said depositing step comprises depositing a fourth plurality of dots in remaining pixel locations.

8. A method of printing with a liquid ink printhead ejecting ink in a number, n, of multiple swaths on a recording medium to form an image including dots arranged in a plurality of scanlines including pixel locations, comprising:

depositing a first plurality of dots on one of the plurality of scanlines at first locations spaced as a function of the number of swaths; and depositing a second plurality of dots on said one of the scanlines at multiples of pixel locations (n+1)/2 if n is an odd number or pixel locations (n+3)/2 if n is an odd number.

9. A method of printing with a liquid ink printhead ejecting ink in a number, n, of multiple swaths on a recording medium to form an image including dots arranged in a plurality of scanlines including pixel locations, comprising:

depositing a first plurality of dots on one of the plurality of scanlines at first locations spaced as a function of the number of swaths; and depositing a second plurality of dots on the scanline at multiples of pixel locations n/2 if n is even and if n/2 is an odd number or pixel locations (n/2)+2 if n is even and if n/2 is an odd number.

10. A method of printing with a liquid ink printhead ejecting ink in a number, n, of multiple swaths on a recording medium to form an image including dots arranged in a plurality of scanlines including pixel locations, comprising:

depositing a first plurality of dots on one of the plurality of scanlines at first locations spaced as a function of the number of swaths; and depositing a second plurality of dots on the scanline at pixel locations n/2+1 if n is an even number and if n/2 is an even number.

11. The method of claims 8, 9, or 10, wherein said second depositing step comprises determining the greatest number, m, of consecutive open pixel locations of the scanline.

12. The method of claim 11, wherein said depositing step comprises depositing a third plurality of dots adjacent to a previously deposited dot separated from another previously deposited dot by m open pixel locations.

13. The method of claim 12, wherein said depositing step comprises depositing a fourth plurality of dots in remaining pixel locations.

* * * * *